(12) United States Patent
Pascovici

(10) Patent No.: US 7,231,019 B2
(45) Date of Patent: Jun. 12, 2007

(54) AUTOMATIC IDENTIFICATION OF TELEPHONE CALLERS BASED ON VOICE CHARACTERISTICS

(75) Inventor: Andrei Pascovici, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 360 days.

(21) Appl. No.: 10/777,322

(22) Filed: Feb. 12, 2004

(65) Prior Publication Data

US 2005/0180547 A1    Aug. 18, 2005

(51) Int. Cl.
*H04M 1/64* (2006.01)
(52) U.S. Cl. .................. 379/88.02; 704/250; 704/255; 704/256.1
(58) Field of Classification Search .. 379/88.01–88.04; 704/246
See application file for complete search history.

(56) References Cited

U.S. PATENT DOCUMENTS

| | | | |
|---|---|---|---|
| 5,649,056 A * | 7/1997 | Nitta ........................... | 704/256 |
| 5,710,866 A | 1/1998 | Alleva et al. ............... | 395/2.65 |
| 5,825,977 A * | 10/1998 | Morin et al. ................ | 704/255 |
| 5,893,059 A * | 4/1999 | Raman ..................... | 704/256.2 |
| 5,946,654 A * | 8/1999 | Newman et al. ............ | 704/246 |
| 6,088,669 A * | 7/2000 | Maes .......................... | 704/231 |
| 6,141,641 A | 10/2000 | Hwang et al. .............. | 704/243 |
| 6,629,073 B1 | 9/2003 | Hon et al. ................... | 704/256 |
| 6,684,186 B2 * | 1/2004 | Beigi et al. ................. | 704/246 |
| 6,754,626 B2 * | 6/2004 | Epstein ....................... | 704/235 |
| 6,978,238 B2 * | 12/2005 | Wohlsen et al. ............ | 704/246 |
| 7,162,421 B1 * | 1/2007 | Zeppenfeld et al. ........ | 704/233 |
| 2001/0029452 A1 * | 10/2001 | Chen .......................... | 704/251 |

FOREIGN PATENT DOCUMENTS

EP    1 345 394 A    9/2003

OTHER PUBLICATIONS

L.F. Lamel & J.L. Gauvain, "Speaker Verification Over the Telephone", *LIMSI-CNRS*, Apr. 1998, pp. 76-79.
Julia L. Heck & Cheyer A., "A Speaker Identification Agent", *AVBPA*, 1997, pp. 261-266.
L. Lamel & Jean-Luc Gauvain, "Speaker Recognition With the Switchboard", *LIMSI-CNRS*, 1997, pp. 1-4.
D. Tran, M. Do, M. Wagner & T. V. Le, "A Proposed Decision Rule for Speaker Identification Based on a Posteriori Probability", *Human-Computer Communications Laboratory, Univeristy of Canberra*, Apr. 1998, pp. 85-88.

(Continued)

*Primary Examiner*—Fan Tsang
*Assistant Examiner*—Simon Sing
(74) *Attorney, Agent, or Firm*—Westman, Champlin & Kelly

(57) ABSTRACT

A method and apparatus are provided for identifying a caller of a call from the caller to a recipient. A voice input is received from the caller, and characteristics of the voice input are applied to a plurality of acoustic models, which include a generic acoustic model and acoustic models of any previously identified callers, to obtain a plurality of respective acoustic scores. The caller is identified as one of the previously identified callers or as a new caller based on the plurality of acoustic scores. If the caller is identified as a new caller, a new acoustic model is generated for the new caller, which is specific to the new caller.

31 Claims, 6 Drawing Sheets

OTHER PUBLICATIONS

"Cisco Personal Assistant", *Cisco Product Catalog*, Dec. 2003, pp. 1-8.

Aaron E. Rosenberg et al., "Foldering Voicemail Messages by Caller Using Text Independent Speaker Recognition", *Proceedings of Int'l Conf. of Speech and Language Processing ICSLP 2000*, Oct. 20, 2000, vol. 2, pp. 474-477.

Michael J. Carey et al., "A Speaker Verification System Using Alpha-Nets", *Internat'l Conf. on Acoustics, Speech and Signal Processing, IEEE*, Apr. 14, 1991, vol. 2, Conf. 16, pp. 397-400.

Aaron Rosenberg et al., "Caller Identification for the ScanMail Voicemail Browser", *Proceedings of the Eurospeech 2001 Conf.*, Sep. 7, 2001, vol. 4, pp. 2373-2376.

R.A. Finan et al., "Imposter Cohort Selection for Score Normalisation in Speaker Verification", *Pattern Recognition Letters*, Sep. 1997, vol. 18, No. 9, pp. 1-8.

T. Matsui et al., "Concatenated Phoneme Models for Text-Variable Speaker Recognition", *Statistical Signal and Array Processing*, Apr. 27, 1993, vol. 4, pp. 391-394.

S. Furui, "Recent Advances in Speaker Recognition", *Pattern Recognition Letters*, Sep. 1997, vol. 18, No. 9, pp. 859-872.

E. Bernstein et al., "Recognizing Call-Center Speech Using Models Trained from Other Domains", *Workshop at University College Conference Center, University of Maryland*, May 16-19, 2000, pp. 1-4.

\* cited by examiner

AUTOMATIC IDENTIFICATION OF TELEPHONE CALLERS BASED ON VOICE CHARACTERISTICS

FIELD OF THE INVENTION

The present invention relates to a computer-implemented method and apparatus for automatically identifying callers of incoming telephone calls based on voice characteristics. In particular, the present invention relates to computerized speech recognition techniques for routing and screening incoming telephone calls.

BACKGROUND OF THE INVENTION

In telephone communication systems, call centers are often used for routing or pre-screening calls based on the caller's responses to automated prompts. Such prompt-response mechanisms are often time consuming since the caller must navigate through a large number of prompts before being routed to the desired call recipient or information database. Also, such mechanisms rely on the caller to properly follow the prompt commands. If the caller does not cooperate with the prompt commands, the call cannot be routed accurately. Similarly, call-screening mechanisms rely on cooperation by the caller in truthfully responding to the screening prompts. This makes it difficult for the caller and the recipient to accurately and efficiently route and screen calls.

Speech recognition systems have therefore been proposed to assist in the call routing process. However, such speech recognition systems have also relied on a prompt-response mechanism in which the caller must respond to predetermined prompts. For example, the system may request that the caller state the caller's name and/or state a predetermined word or sequence of words representing the subject matter of the call or the identity of the desired recipient. Again, these systems are effective only if the caller is truthful when responding to the predetermined prompts. Also, the speech recognition models that are used to determined the content of the speech must be able to accurately segment the content given a wide range in voice input characteristics for different callers. Such systems can therefore remain time consuming or inaccurate and can be easily circumvented by uncooperative callers.

Improved methods and apparatus are therefore desired for automatically pre-screening and routing incoming telephone calls based on voice characteristics.

SUMMARY OF THE INVENTION

One embodiment of the present invention is directed to a method of identifying a caller of a call from the caller to a recipient. A voice input is received from the caller, and characteristics of the voice input are applied to a plurality of acoustic models to obtain a plurality of respective acoustic scores. The plurality of acoustic models includes a generic acoustic model and acoustic models of any previously identified callers. The caller is identified as one of the previously identified callers or as a new caller based on the plurality of acoustic scores. If the caller is identified as a new caller, a new acoustic model is generated for the new caller, which is specific to the new caller.

Another embodiment of the present invention is directed to a system for identifying a caller of a call from the caller to a recipient. The system includes a receiver, for receiving a voice input from the caller, and an acoustic model repository for storing a plurality of acoustic models. The plurality of acoustic models includes a generic acoustic model and acoustic models of any previously identified callers. The system further includes a module for applying characteristics of the voice input to the plurality of acoustic models to produce a plurality of respective acoustic scores and for identifying the caller as one of the previously identified callers or a new caller based on the plurality of acoustic scores. An acoustic model generator generates a new acoustic model for the new caller if the acoustic score for the generic acoustic model is better than the acoustic scores for the acoustic models of the plurality of previously identified callers.

Another embodiment of the present invention is directed to a computer-readable medium comprising computer-executable instructions that, when executed by a computer, performs a method of identifying a caller of a call. The method includes receiving a voice input from the caller and applying characteristics of the voice input to a plurality of acoustic models to obtain a plurality of respective acoustic scores. The plurality of acoustic models includes a generic acoustic model and acoustic models of any previously identified callers. The caller is identified as one of the previously identified callers or a new caller based on the plurality of acoustic scores. If the caller is identified as a new caller, a new acoustic model is generated for the new caller, which is specific to the new caller.

Yet another embodiment of the present invention is directed to a method of identifying a caller in which a voice input is received from the caller. The voice input is segmented into a sequence of recognized speech units using a caller-independent, generic acoustic model. Characteristics of the voice input are applied to a sequence of speech unit models of the recognized speech units within a plurality of acoustic models, which includes the generic acoustic model and acoustic models of any previously identified callers. The caller is identified as one of a plurality of previously identified callers or as a new caller based on how well the characteristics of the voice input fit the plurality of acoustic models.

DETAILED DESCRIPTION OF ILLUSTRATIVE EMBODIMENTS

Figure 1:
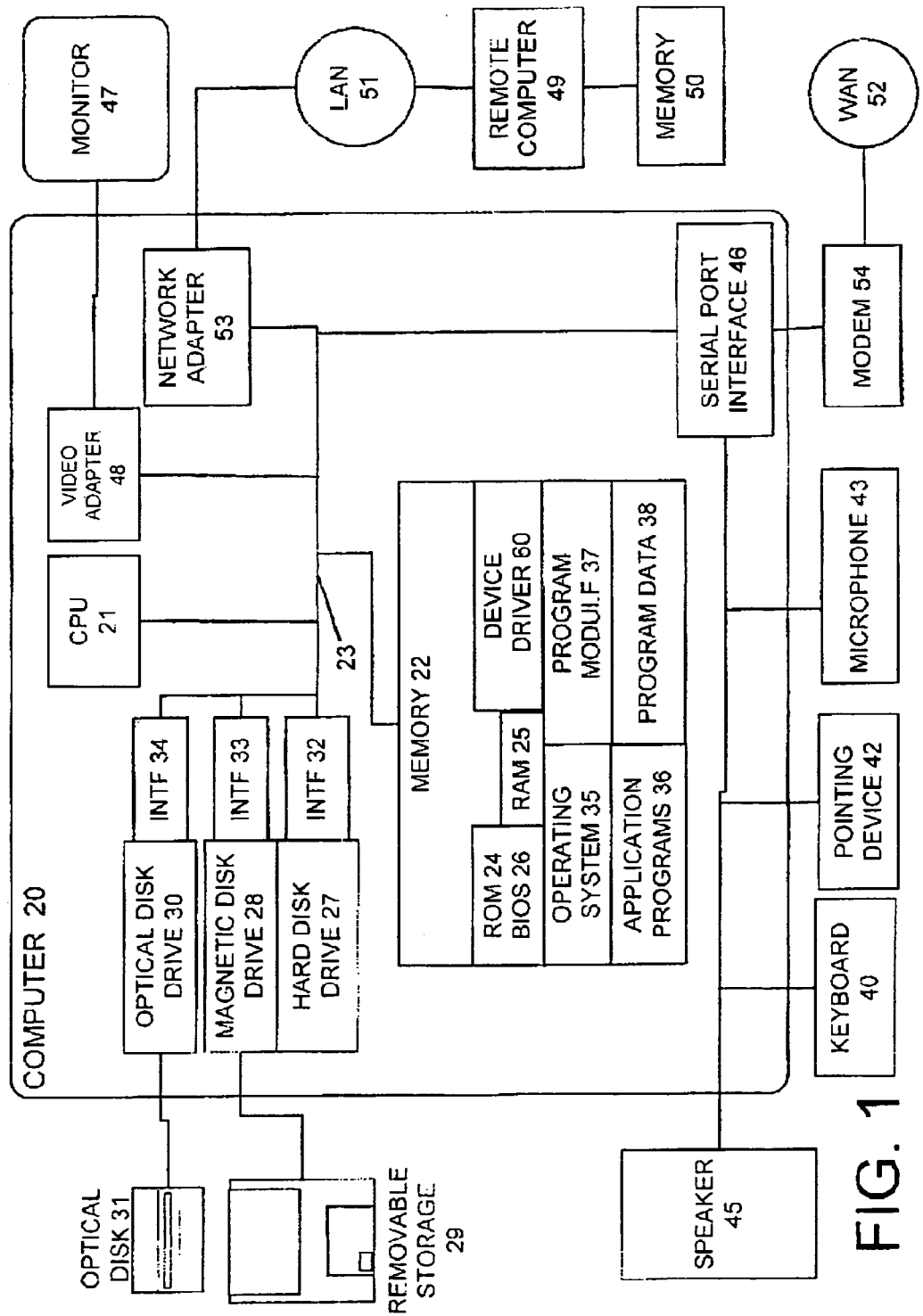
FIG. 1 is a block diagram of an exemplary system for implementing the invention in the form of a conventional personal computer, according to one embodiment of the present invention.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer or other computing device. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interfaces 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Although FIG. 1 shows an exemplary environment, the present invention is not limited to a digital-computing environment. In particular, the present invention can be operated on analog devices or mixed signal (analog and digital) devices. Furthermore, the present invention can be implemented on a single integrated circuit, for example. Modules con be implemented in hardware, software or a combination of hardware and software.

As discussed above, computer 20 typically includes a variety of computer readable media. Computer readable media can be any available media that can be accessed by computer 20 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 2:
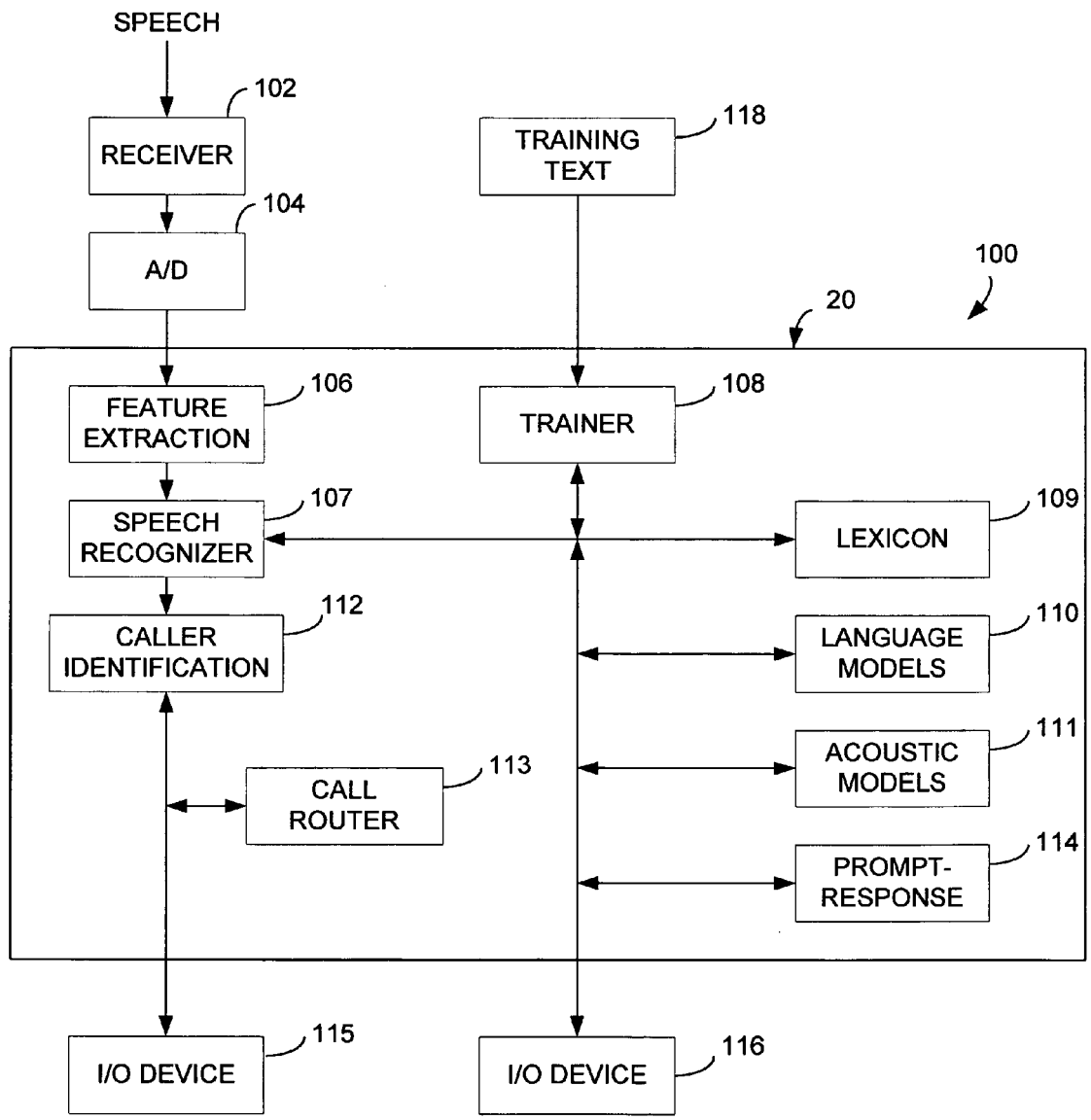
FIG. 2 is a more detailed block diagram of a system of modules for identifying a caller, according to one embodiment of the present invention.

FIG. 2 provides a more detailed block diagram of a system of modules 100 that can be implemented in the general environment descried with reference to FIG. 1 for identifying a caller according to one embodiment of the present invention. System 100 includes a receiver 102 for receiving an input speech signal of a call from a caller to a recipient. The input speech signal can be any form of an analog signal or a digital signal. The input speech signal can be transmitted to receiver 102 by any communication method through any transmission medium. The "recipient" can be an individual person, a group of individuals, a call-routing location or an information database, for example.

Receiver 102 can include any suitable receiver for receiving the type of speech input signal that is being transmitted. For example with the advent of telephony-enabled personal computers (PCs) and Phone Addition Pocket PCs, receiver 102 can include network adapter 53 for coupling to LAN 51 or serial port interface 46 for coupling to modem 54 and WAN 52.

If the input speech signal is an analog signal, system 100 includes an analog-to-digital converter (A/D) 104 for converting the signal to a series of digital values. In one embodiment, A/D converter 104 samples the analog signal at 16 kHz, thereby creating 16 kilobits of speech data per second. However, any other sampling rate can be used.

The digital signals representing samples of the input speech signal are supplied to computer 20. Computer 20 includes feature extraction module 106, speech recognizer (e.g., decoder) 107, trainer module 108, lexicon module 109, language model repository 110, acoustic model repository 111, caller identification module 112, call router 113 and prompt-response module 114. Elements of computer 20 are coupled to output device 115 and I/O device 116, for example.

It should be noted that the entire system 100, or part of system 100 can be implemented in the environment illustrated in FIG. 1. Feature extraction module 106 and trainer module 108 can be either hardware modules in computer 20 or software modules stored in any of the information storage devices disclosed in FIG. 1 and accessible by CPU 21 or another suitable processor. In addition, lexicon storage module 109, acoustic models 111, and language models 110 are also preferably stored in any of the suitable memories devices shown in FIG. 1. Further, search engine 107 can be implemented in CPU 21, which can include one or more processors or can be performed by a dedicated speech recognition processor employed by personal computer 20. In addition, output device 115 and I/O device 116 can include any of the I/O devices shown in FIG. 1, such as keyboard 40, pointing device 42, monitor 47, a printer or any of the memory devices shown in FIG. 1, for example.

The digital signals received by receiver 102 or generated by A/D converter 104 is provided to feature extraction module 106. In one embodiment, feature extraction module 106 includes a conventional array processor, which performs spectral analysis on the digital signals and computes a magnitude value for each frequency band of a frequency spectrum.

Feature extraction module 106 divides the digital signals into frames, each of which includes a plurality of digital samples. In one embodiment, each frame is approximately 10 milliseconds in duration. The frames are then encoded into a feature vector reflecting the spectral characteristics for a plurality of frequencies bands. In the case of discrete and semicontinuous hidden Markov modeling, feature extraction model 106 also encodes the feature vectors into one or more code words using vector quantization techniques and a codebook derived from training data. Thus, feature extraction module 106 provides, at its output, the feature vectors (or codewords) for each spoken utterance. Feature extraction module 106 preferably provides the feature vectors at a rate of one feature vector approximately every 10 milliseconds, for example.

Examples of feature extraction modules include modules for performing Linear Predictive Coding (LPC), LPC derived cepstrum, Perceptive Linear Prediction (PLP), Auditory Model Feature Extraction, and Mel-Frequency Cepstrum Coefficients (MFCC) feature extraction. Note that the present invention is not limited to these feature extraction modules and that other modules may be used within the context of the present invention.

The stream of feature vectors produced by feature extraction module 106 is provided to speech recognizer 107, which identifies a most likely sequence of speech units, such as words or phonemes, based on the stream of feature vectors, one or more acoustic models in repository 111, one or more of language models in repository 110, and lexicon 109. Caller identification module 112 identifies the caller as a new caller or one of any previously identified callers, by applying the feature vectors of the voice input to generic and callerspecific models of the speech units identified by speech recognizer 107, which are stored in repository 111. In one embodiment, caller identification module 112 also uses generic and caller-specific language models, stored in repository 110, to assist in the identification. Module 112 outputs the caller identity and/or text of the most likely sequence of uttered words to call router 113 or stores these results in one of the memory devices shown in FIG. 1, for example. The results can also be output to a user or operator through I/O device 115. Call router 113 can then screen the call or route the call to one or more selected destinations based on the identity of the caller and/or the content of the call.

An acoustic model is a model that indicates how likely it is that a sequence of feature vectors would be produced by a particular sequence of acoustic units found in a sequence of hypothesized speech units. Under some embodiments of the present invention, each speech unit can include any commonly used acoustic unit such as a senone, a phoneme, a diphone, a syllable, or a word. In some embodiments, each speech unit is a combination of a set of sub-units.

As mentioned above, acoustic model repository 111 includes at least one acoustic model for each previously identified caller and a generic model that represents the speech characteristics of a wide range of speakers. Each acoustic model includes a set of models, such as hidden Markov models (HMMs, of a plurality of predefined speech units to be detected. For example, each HMM can model a single phoneme. In one embodiment, speech recognizer 107 applies the feature vectors received from feature extraction module 106 to the generic acoustic model to determine a most likely phoneme that represents the feature vectors, and hence represents the utterance received from the caller.

A typical acoustic model is trained before it is used to decode a sequence of input feature vectors. For example in FIG. 2, such training can be performed by trainer 108 based on training text 118, past model parameters from the acoustic model and training feature vectors from feature extractor 106. In some embodiments of the present invention, the generic acoustic model is trained using a generic training text representative of a generic set of speakers. This generic acoustic model can then be used to form the caller-specific acoustic models in which the HMMs are updated with each set of feature vectors generated for that caller. In one embodiment, a unique acoustic model can be generated for a particular caller based on a single utterance, such as an utterance of one or more phonemes. As more calls and utterances are received from that caller, the corresponding acoustic model for that caller continues to be updated.

Speech recognizer engine 107 can also access one or more language models stored in repository 110 to assist in identifying a most likely word or word sequence represented by the input data. Repository 110 can store a generic, caller-independent language model and/or a plurality of caller-specific language models. In one embodiment, each language model includes a context-free grammar (CFG) or a statistical n-gram model, such as a trigram. A trigram model determines the probability of a sequence of words based on the combined probabilities of 3-word segments of the sequence. Such a language model can be modified to provide a unique model for each previously identified caller, as discussed in more detail below. The caller-specific language models can be used to assist computer 20 in identifying words or subject matter commonly used by a specific caller caller.

The generic language model can include a 60,000 word trigram language model, for example, derived from the North American Business News and set out in greater detail in a publication entitled "CSR-III Text Language Model", University of Pennsylvania, 1994.

Figure 3:
FIG. 3. is a waveform diagram illustrating an acoustic input "WAV" received from a caller as a function of time.
Figure 4:
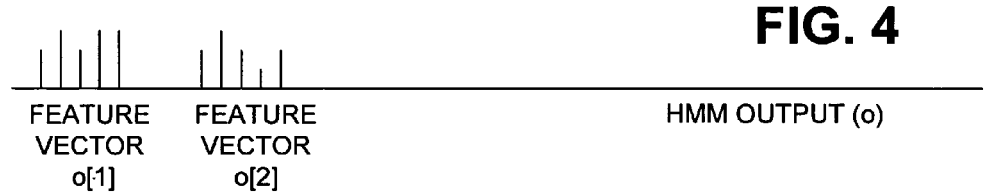
FIG. 4 is a diagram illustrating a set of feature vectors generated for the acoustic input shown in FIG. 3.
Figure 5:
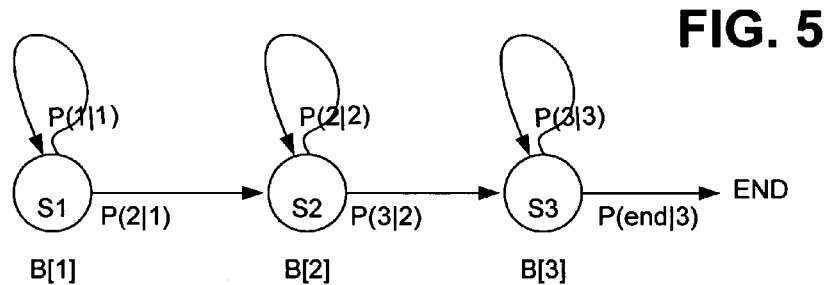
FIG. 5 is a state diagram illustrating a basic hidden Markov model (HMM) for one speech unit.

FIGS. 3-5 illustrate the formation of a set of features vectors and the details of a hidden Markov model, which can be used according to one embodiment of the present invention. FIG. 3. is a waveform diagram illustrating an acoustic input "WAV" received from the caller as a function of time. As mentioned above, the acoustic input is divided into a plurality of frames of 10 milliseconds each, for example. Feature extraction module 106 generates a set of feature vectors O[k] for each 10 millisecond frame, for k=1, 2, ..., as shown in FIG. 4. The feature vectors O[k] are most often some transformation of the Fast Fourier Transform (FFT) of the acoustic input WAV, windowed in slots of 10 milliseconds. The FFT coefficients reflect speech characteristic such as pitch and vocal cavity of the speaker. These feature vectors can then be applied to the hidden Markov models of the respective acoustic model.

FIG. 5 is a state diagram illustrating a basic hidden Markov model (HMM) for one speech unit (e.g., phoneme, senone, triphone, etc.). A basic HMM model is a language-independent unit, which represents the acoustic properties of an utterance. Each state can either remain in the present state or transition to the next state within the model. Each speech unit has three states, labeled S1, S2 and S3 in FIG. 5, which represent an "onset" state, a "main" state and an "ending" state for the speech unit. Each state can only remain in that state or transition to the next state along the arrows shown in FIG. 5. The transition from one state to the next has a probability P(S2|S1), which represents the conditional probability of transitioning from state S1 to state S2 given the present state S1. Each state also has a probability distribution B[i], for i=1 to 3, which represents a "probability to output" (a number between 0 and 1) of any feature vector 0[k], which reflects the likelihood of observing of any of the possible feature vectors. For example, the probability distributions can be Gaussian distributions.

Each acoustic model in repository 111 includes a collection of such hidden Markov models for each Phoneme. For example, the Phoneme "AX" preceded by the Phoneme "B" and succeeded by the Phoneme "H" (notation B-AX+H, as in "bah") is different than the exact same "AX" preceded by "L" and succeeded by "H" (notation L-AX+H, as in the last part of "blah").

When performing speech recognition using an existing acoustic model, the initial state of the system is S1, with probability 1, and the probabilities P[i|j] and the probability densities B[i] are known for each state in the HMM. When recognizing a phoneme, the acoustic input is converted into a sequence of feature vectors o[k], and speech recognizer 107 (shown in FIG. 2) determines what the probability P(o[k]|model) is given the current HMM model.

In other words, speech recognizer 107 determines how likely it is that the sounds represented by the sequence of input feature vectors are actually the phoneme modeled by the current HMM under consideration. The phoneme modeled by the HMM having the highest probability is identified as the uttered phoneme.

When training an acoustic model, such as when training the generic model or updating a caller-specific model, it is assumed that the acoustic input WAV and therefore the sequence of feature vectors O[k] is known. Speech recognizer 107 (or caller identification module 112) generates a model (P'[i|j] and B'[i] for each state) that yields the highest probability of observing the O[k] output sequence for each phoneme. For example in one embodiment, caller identification module 112 uses a Baum-Welch HMM reestimation method for updating or otherwise adapting the generic acoustic model to reflect the characteristics of a particular speaker. For example the acoustic model for a particular speaker can initially include the generic HMM models of the generic acoustic model, and then the HMM models for the phonemes that occur in the present call can be updated to reflect the speech characteristics of the caller by the Baum-Welch HMM reestimation method.

Figure 6:
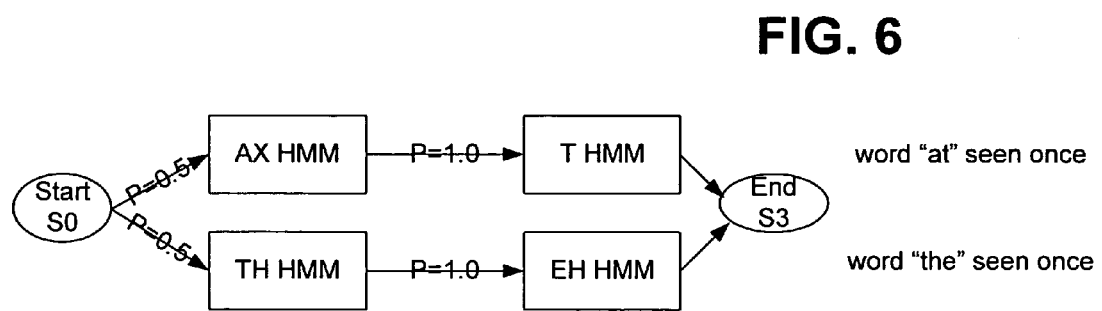
FIG. 6 is a diagram illustrating an example of a simplified language model, which can be used in one embodiment of the present invention.

FIG. 6 is a diagram illustrating an example of a simplified language model, which can be used in one embodiment of the present invention. When building a trigram language model, the first step is to collect a large body of text in the representative language. The second step is to build frequency counts P1[W] for each word W, P2[W|W0] for each bigram (couple of words), and P3[W|W1,W2] for each trigram. The speech recognizer will also be limited by a word dictionary (WD) having a list of possible words in the respective language. Next, a discounting strategy is used to build a probability P[W|W1,W0] for every word in the word dictionary. The discounting strategy is used to avoid using all possible two-or-three word sequences since their number is too large. All words in the word dictionary are broken down into phonemes, which are characterized by a phoneme HMM similar to that shown in FIG. 5.

Next, a master HMM is created by gluing together the phoneme HMMs and adjusting the initial probability to enter each of their start states (S1) according to the P[W|W1,W0] from the HMM model. In the simplified example shown in FIG. 6, only two words, "at" and "the" have been seen, and each of these words have been seen only once. Therefore, the master HMM will have a distinct start state S0 with an initial probability of "1" and transition probabilities of "0.5" to the "AX" phoneme HMM and the "TH" phoneme HMM. Since there are only two words, the "AX" HMM has a transitional probability of 1.0 to the "T" HMM, and the "TH" HMM has a transitional probability of 1.0 to the "EH" HMM. The "TH" HMM and the "EH" HMM transition to the end state S3.

In one embodiment of the present invention, a unique language model is created for each uniquely identified caller by adapting a generic language model. The generic language model is adapted by using recognized phrases together with the "large body of text" collected from that caller's incoming calls. This process does not discover new words, but rather new probabilities P[W|W1,W0] since any particular caller is likely to use some word combinations more than others. Also, it is not necessary to collect "words" in the traditional sense in all embodiments. In one embodiment, the language model collects "words" similar to the MS Recognizer available from Microsoft Corporation with its dictation language model. In alternative embodiments, the language model can simply collect "phonemes" or small groups of phonemes as "words", similar to the MS Recognizer with its pronunciation language model. The later embodiments have the advantage of providing useful probabilities of phoneme sequences even when the caller utters unknown words such as names, but are less accurate.

Figure 7:
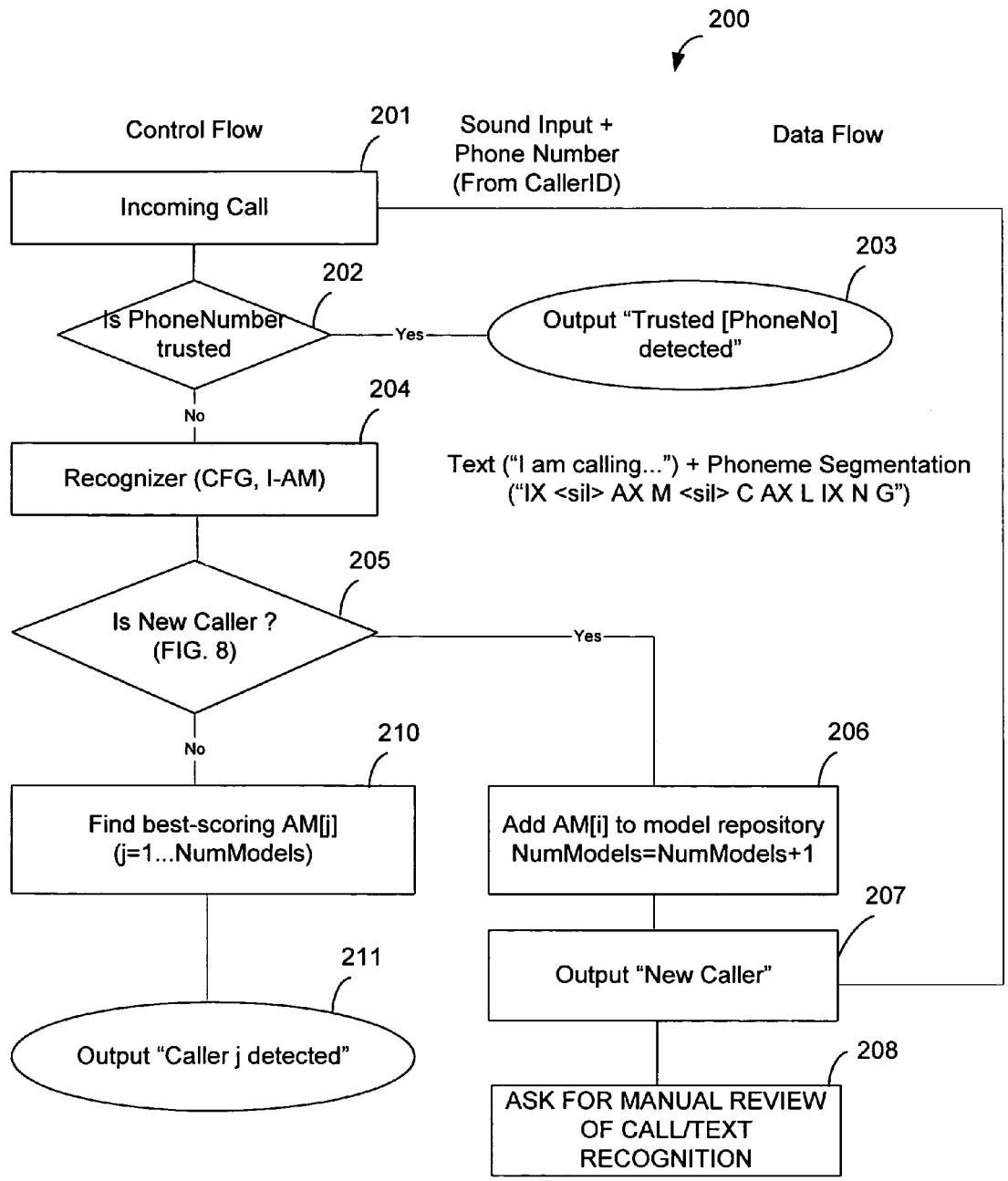
FIG. 7 is a flow chart illustrating a computer-implemented process for identifying callers of telephone calls to a recipient, according to one embodiment of the present invention.

FIG. 7 is a flow chart illustrating a computer-implemented process 200 that can be stored as instructions, for example, on a computer-readable medium and executed by computer 20 (shown in FIG. 1). Process 200 identifies callers of telephone calls to one or more recipients by generating unique acoustic models for each identified caller, according to one embodiment of the present invention.

At step 201, an incoming call is received from a caller. At step 202, a traditional callerID system is used to capture the phone number of the incoming call. If the phone number matches that of a previously defined trusted phone number, the system outputs a signal indicating that a trusted phone number has been detected, at step 203. The callerID system can be used to identify calls arriving from a trusted source and provide an early exit from process 200 so that calls received from this source are not delayed by process 200. The signal generated at step 203 can be used in any suitable manner, such as for routing the incoming call to a particular mailbox or by allowing the call to be routed to the recipient's telephony-enabled device.

If the incoming phone number is not trusted or if the system is not configured with step 202, the voice input is applied to speech recognizer module 107 (shown in FIG. 2) at step 204 for segmentation into a sequence known phonemes. Feature extraction module 106 (also shown in FIG. 2) generates the corresponding feature vectors from the voice input and applies the feature vectors to a generic, context-free grammar (CFG) module and the caller-independent, generic acoustic model (labeled "I-AM" in FIG. 7). The context-free grammar module can include a free-form dictation model or a pronunciation stochastic language model, for example. The CFG allows for the recognition of any utterance. It is not necessary for the CFG to generate a text form of the utterance as long as it produces a reasonably accurate phoneme segmentation.

The caller-independent, generic acoustic model I-AM can include a model that is capable of working for any caller. Such a generic acoustic model is sometimes referred to a "gender-independent" acoustic model, which works for male, female and child callers.

Using the CFG and the caller-independent generic acoustic model I-AM, the speech recognizer segments the voice input into a sequence of recognized phonemes.

For example, if the voice input includes "I am calling . . . " the speech recognizer generates the text form of the utterance ("I am calling . . . ") plus the phoneme segmentation ("IX <sil> AX M <sil> C AX L IX N G").

At step 205 caller identification module 112 (FIG. 2) determines whether the caller is a new caller or a previously identified caller. This process is described in greater detail below with respect to FIG. 8. If the caller is a new caller, process 200 transitions to step 206 where caller identification module 112 adds a new acoustic model AM[i] to the acoustic model repository 111 (FIG. 2) and increments a model number variable NUMMODELS (i.e., number of previously identified callers) by one. Caller identification module 112 generates the new acoustic model AM[i] by making a copy of the generic acoustic model AM[0] and then updating the HMM's of any phonemes uttered by the caller in the incoming call, as described above.

At step 207 caller identification module 112 outputs a signal indicating a "New Caller", which can be used by call routing module 113 (also FIG. 2) or another call management system for directing the call as desired. Caller identification module 112 can also store a sound file representing the speech input and the corresponding text (if recognized at step 204).

In one embodiment, caller identification module 112 asks for a manual review of the caller/text recognition through I/O device 115 (FIG. 2), at step 208. The user or system operator can review the text of the call, listen to the sound of the call and/or view the caller identification and make any corrections through I/O device 115. For example, the user can review and discard calls or accept or deny classifications made by the identification module. After step 207, process 200 returns to step 201 to receive another incoming call.

If, at step 205, caller identification module 112 identifies the caller as not a new caller, process 200 transitions to step 210 to identify which of the previously identified callers has called again. Caller identification module 112 determines the caller-specific acoustic model that most closely matches the speech characteristics in the utterance of the incoming call. In one embodiment, caller identification module 112 applies the voice characteristics (e.g., features vectors) to the corresponding HMM's in each caller-specific acoustic model and identifies the acoustic model AM[j] having the best acoustic score, for j=1 to NUMMODELS, as described in more detail in FIG. 8. At step 211, caller identification module 112 outputs a signal indicating that "Caller j is Detected", where "j" corresponds to the acoustic model having the best acoustic score in step 210.

Figure 8:
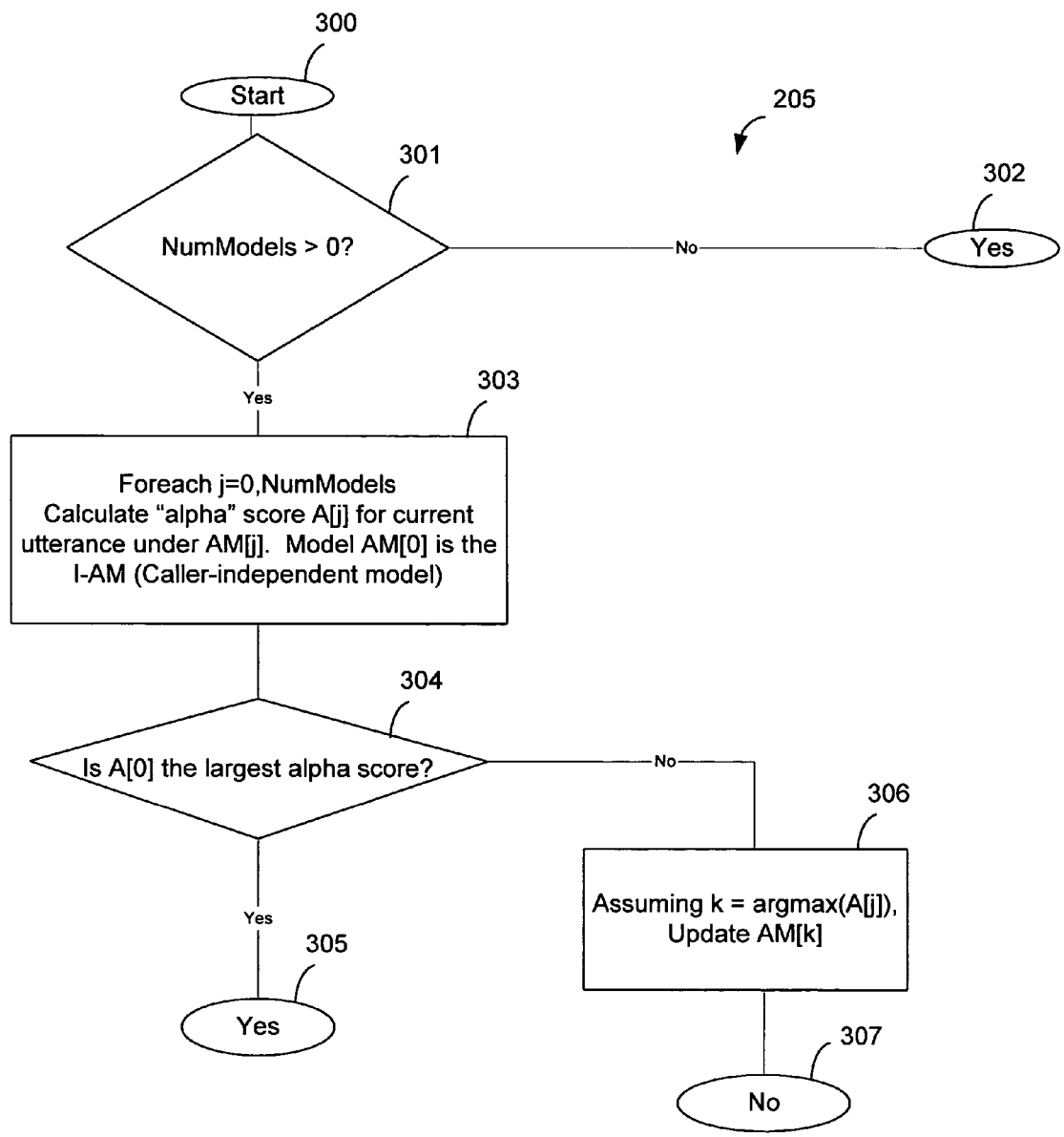
FIG. 8 is a flow chart illustrating detection of a new caller or a previously identified caller within the process shown in FIG. 7, according to one embodiment of the present invention.

FIG. 8 is a flow chart illustrating the detection of a new caller or a previously identified caller in step 205 of FIG. 7, according to one embodiment of the present invention. The process enters step 205 at 300. At step 301, caller identification module 112 determines whether the number of acoustic models NUMMODELS for previously identified callers is greater than 0. If not, the caller of the present incoming call is a new caller, and process 205 exits at step 302. If the number of previously identified callers is greater than 0, the current caller could be a new caller or one of the previously identified callers. The process then transitions to step 303.

At step 303, caller identification module 112 calculates the acoustic or "alpha" score A[j] for the current utterance under each of the acoustic models AM[j] in the acoustic model repository 111, for j=0 to NUMMODELS, where model AM[0] is the caller-independent, generic model I-AM. An alpha score is known as a "forward-pass score", which is the acoustic score resulting from running the speech recognizer decoder or search tree on the segmentation produced in step 204 of FIG. 7 (by the caller-independent model AM[0]) while using the acoustic model AM[j]).

At step 304, caller identification module 112 determines whether the alpha score A[0] for the generic acoustic model AM[0] has the largest (or otherwise best) alpha score. If the current utterance matches the generic acoustic model better than any of the caller-specific acoustic models, then the caller is identified as a new caller, and the process exits at step 305. If the alpha score A[0] for the generic acoustic model is not the largest alpha score, then the caller is identified as one of the previously identified callers, and caller identification module 112 transitions to step 306 for identifying the particular caller.

Assuming the variable "k" equals the index at which the alpha score A[j] is maximum (k=argmax(a[j])) then caller "k" is identified as the caller and the corresponding caller-specific acoustic model AM[k] for caller "k" is updated to reflect the speech characteristics of the new utterance. In this manner, each time an incoming call is received by a previously identified caller, the corresponding acoustic model for that caller is further trained based on the acoustic units contained in the call to better represent the speech characteristics of the caller. After the caller-specific acoustic model is updated, the process exits at step 307.

In one embodiment, the caller-specific acoustic model AM[k] can be created or updated with as little as one utterance, as opposed to requiring training through a large number of utterances and repetitions of utterances as is common for traditional speech recognition or dictation software. Single utterance training can be accomplished with currently available speech recognition software, such as the Microsoft MS recognizer, by either repeating the sound input several times and applying it repeatedly to the MS recognizer or by reconfiguring the MS recognizer to train with a signal utterance. Other types of speech recognizers or decoders can also be used in alternative embodiments.

In an alternative embodiment, step 304 can be further refined by splitting the current voice input into several subsections, such as two subsections, and computing two alpha scores A0[j] and A1[j] for the two subsections with each acoustic model. Step 304 will return a "NO" (the generic models does not have the highest acoustic score) only when both A0[j] and A1[j] are maximum (argmax(AM[k])) on the same index K. This process can be useful for filtering calls having more than one speaker in the voice input and for further refining the identification process.

Figure 9:
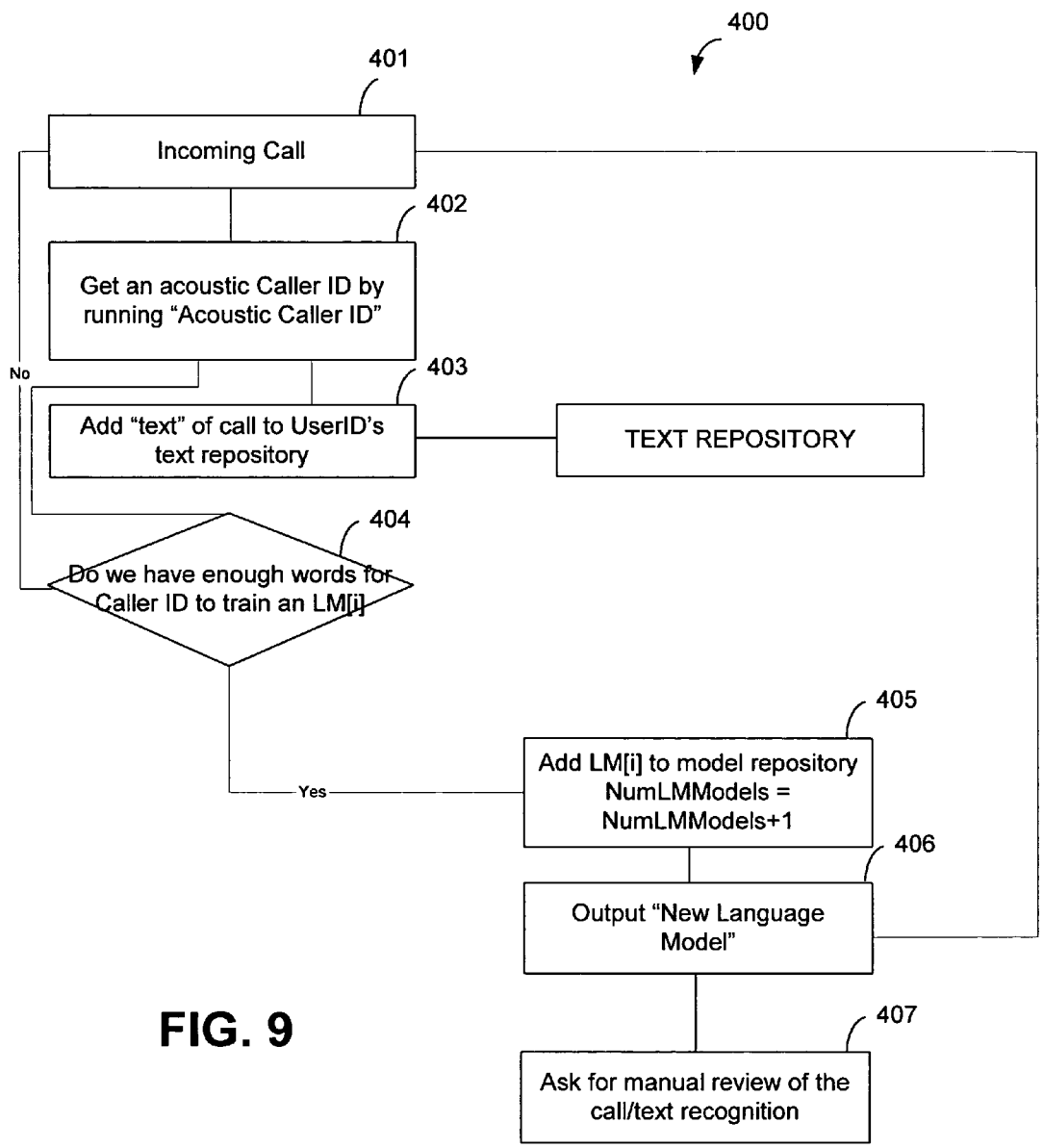
FIG. 9 is a flow chart illustrating a process for training a caller-specific language model to detect a caller by the content of the call, according to one embodiment of the present invention.

FIG. 9 is a flow chart illustrating a process 400 for training a caller-specific language model ("probabilistic CFG") to detect a user by the content of the call (rather than by acoustics). Process 400 can be used in conjunction with process 200 shown in FIG. 7 to increase the accuracy of the caller identification or as an alternative method of identifying the caller. The incoming call is received at step 401. At step 402, process 400 gets an acoustic caller identification by running the acoustic caller identification process shown in FIG. 7. At step 403, process 400 adds the recognized "text" of the call (as segmented by speech recognizer 107 in FIG. 2) to the caller's text repository for the corresponding caller-specific language model. Step 403 corresponds to the step of "collecting a large body of text" described with reference to FIG. 6.

At step 404, process 400 determines whether there are enough words in the text repository for the particular caller to train a language model LM(i). If not, process 400 returns to step 401 to receive a further incoming call from that caller. If there is a sufficient number of words, process 400 trains a new language model LM[i] (for caller "i") according to the process discussed with respect to FIG. 6 and adds LM[i] to language model repository 110 at step 405. Process 400 then increments the number of caller-specific language models NUMLMMODELS by one.

At step 406, process 400 outputs a signal indicating a "New Language Model" and can ask the system user for a manual review of the call and the text recognition at step 407. The user can review and revise the data through I/O device 115 (shown in FIG. 2). Process 400 then returns to step 401 to receive a further incoming call.

Process 400 illustrates how the acoustic caller identification process shown in FIG. 7 can be used to build a corresponding language model for each unique caller. In order to identify a caller using the language models, once enough language models have been trained, caller identification module 112 can simply run speech recognizer module 107 with the generic acoustic model and with each caller-specific language model LM[i] activated in turn. The language model producing the text recognition with the highest probability corresponds to the current caller.

The use of caller-specific language models to identify a caller will identify semantic similarities of the content of the current call to one of the caller-specific language models LM[i]. However, it may be the case that the current caller is a different caller (not caller "i") who talks about the same subject matter that caller "i" talked about. Therefore, caller-specific language models are preferably used in conjunction with caller-specific acoustic models for properly identifying unique callers. For example, the acoustic caller identification process shown in FIG. 7 can be weighted more heavily than the language model caller identification process trained in FIG. 9 when reporting a result to the identification system. For example if the two identification methods produce different results, the language model detection result will be used only if it has a much higher probability than the caller-specific acoustic score of the highest scoring acoustic model. Again, the system user or operator of the call center can override any classifications made by either the acoustic model identification subsystem or the language model identification subsystem.

The caller identification processes shown in FIGS. 7-9 may create multiple acoustic and language models for callers misidentified as "new callers". This can occur for example when the phonemes or subject matter of two or more different calls from the same caller do not overlap. As the acoustic and language models continue to be trained with each successive new call from a previously identified caller, the models that correspond to the same caller will begin to overlap one another and can then be merged. The caller identification system can include a merging module that periodically reviews all caller-specific models to determine whether any models should be merged based on predefined criteria. This criteria can be the similarity of model probabilities for a given set of feature vectors, for example.

More specifically, phoneme HMMs typically model state transition probabilities using multidimensional Gaussian distributions (in the Feature Vector space) determined by a Mean vector and Variance Matrix. The merging module could simply cluster said Mean Vectors and/or Variance matrices for the corresponding phonemes for each user and see whether or not they are close enough to be merged (using distance functions such as the Bhattacharya distance, which is best suited to compare probability function separation, unlike the normal Euclidean distance).

Furthermore, the caller identification system may (upon learning that say, two already trained AMs are too close to one another) store the "precursor" AM (the one used as input to the training module at step 306 in FIG. 8) as well as the WAV used to train (current user input) and only apply training after the "manual review" (like in step 208 in FIG. 7) of the sample voice inputs from the two callers in question. This prevents the gradual degradation of the trained caller-specific AMs due to them being fed voice inputs from the wrong callers. What exactly is "too close" can be quantified experimentally using any available corpora of User Identification tasks (a large body of phone calls/WAV files belonging to a large enough number of persons.)

One advantage of the caller identification process described above is that the system is capable of identifying a caller with as little as a single utterance from the caller. A new caller-specific acoustic model is created from that utterance for identifying further calls from that caller. Also, the system is capable of identifying a caller even if the caller does not cooperate with any prompt-response mechanisms used to route incoming calls. The acoustic characteristics of any utterance, whether that utterance is a proper answer to a prompt or not, is modeled for that caller. In addition, the system is capable of identifying callers without alerting the caller to the identification process. The system can be used to easily filter unwanted calls of telemarketers, for example, from desired calls from known callers.

Also, large call centers can use this system for more efficiently routing calls to the correct recipient or information database. Some call centers require the caller to navigate through a long maze of prompts before being routed to the correct destination. The present system can provide a previously identified caller with a quick exit from a prompt-response mechanism based on the caller's voiceprint and the recipient or the subject matter of previous calls. Numerous other applications exist for such a caller identification system.

Although the present invention has been described with reference to preferred embodiments, workers skilled in the art will recognize that changes may be made in form and detail without departing from the spirit and scope of the invention.

What is claimed is:

1. A method of identifying a caller of a call from the caller to a recipient, the method comprising:
    (a) receiving a voice input from the caller;
    (b) applying characteristics of the voice input to a plurality of acoustic models, which comprises a generic acoustic model and acoustic models of previously identified callers, to obtain a plurality of respective acoustic scores, wherein the generic acoustic model comprises caller independent models of a plurality of speech units;
    (c) identifying the caller as one of the previously identified callers or a new caller based on the plurality of acoustic scores;
    (d) if the caller is identified as a new caller in step (c), generating a new acoustic model for the new caller from the caller-independent models of the generic acoustic model and modifying the caller-independent models of the speech units that are included in the voice input to represent the characteristics of the voice input received from the new caller such that the new acoustic model for the new caller and the acoustic models of any previously identified callers comprise the same plurality of speech units; and
    (e) generating a user prompt, which identifies certain ones of the acoustic models of previously identified callers for merging together.

2. The method of claim 1 wherein identifying in (c) comprises:
    (c)(1) identifying the caller as one of the previously identified callers if the acoustic score for the respective acoustic model is better than the acoustic score for the generic acoustic model; and
    (c)(2) identifying the caller as a new caller if the acoustic score for the generic acoustic model is better than the acoustic scores for the acoustic models of the plurality of previously identified callers.

3. The method of claim 1 wherein:
    step (a) comprises segmenting the voice input into a sequence of recognized speech units using the generic acoustic model;
    each of the plurality of acoustic models comprises models of the speech units segmented in step (a); and
    step (b) comprises applying the characteristics of the voice input to a sequence of the models of the speech units segmented in step (a) for the plurality of acoustic models.

4. The method of claim 1 wherein the method further comprises:
    (f) if the caller is identified as one of the previously identified callers in step (c), updating the respective acoustic model for the previously identified caller by modifying the models of the speech units that are included in the voice input, based on the characteristics of the voice input.

5. The method of claim 4 wherein step (f) comprises modifying the models of the speech units that are included in the voice input based on as little as a single utterance.

6. The method of claim 1 and further comprising:
    (f) storing the new acoustic model in an acoustic model repository with the plurality of acoustic models such that the new acoustic model becomes one of the plurality of acoustic models in step (b) and the new caller is included as a previously identified caller.

7. The method of claim 1 wherein steps (a) through (c) are performed without alerting the caller during the call that the caller is being identified.

8. The method of claim 1 wherein:
    step (b) comprises splitting the voice input into subsections and applying the characteristics of each subsection to the plurality of acoustic models to obtain a plurality of respective acoustic scores that represent how well the characteristics in each subsection match the respective acoustic models; and
    step (c) comprises, for each subsection, identifying the acoustic model having the best acoustic score for that subsection and identifying the caller as one of the previously identified callers only if the best acoustic scores for all subsections correspond to the same previously identified caller.

9. The method of claim 1 and further comprising:
    (f) maintaining a caller-specific language model for each of the previously identified callers based on the voice inputs from those callers;

(g) applying the characteristics of the voice input to the generic acoustic model and each of the caller-specific language models to produce a plurality of recognized speech unit sequences;
(h) choosing the recognized speech unit sequence that has a highest probability relative to probabilities of the other recognized speech unit sequences; and
(i) identifying the caller based at least in part on the recognized speech unit sequence having the highest probability.

10. The method of claim 9 and further comprising:
(j) if the caller identified in step (i) is different than the caller identified in step (c), generating a user prompt of at least one member of the group comprising: the voice input, the recognized speech unit sequence, the identified callers, the acoustic model of the caller identified in step (c), and of the caller-specific language model of the caller identified in step (h).

11. The method of claim 1 and further comprising:
(f) using a distance measure between the plurality of acoustic models of the previously identified callers to flag the certain acoustic models for merging together.

12. A system for identifying a caller of a call from the caller to a recipient, the system comprising:
a receiver for receiving a voice input from the caller;
an acoustic model repository comprising a plurality of acoustic models, including a generic acoustic model and acoustic models of previously identified callers, wherein the generic acoustic model comprises caller-independent models of a plurality of speech units;
means for applying characteristics of the voice input to the plurality of acoustic models to produce a plurality of respective acoustic scores;
means for identifying the caller as one of the previously identified callers or a new caller based on the plurality of acoustic scores;
acoustic model generator means for generating a new acoustic model for the new caller if the acoustic score for the generic acoustic model is better than the acoustic scores for the acoustic models of the plurality of previously identified callers, wherein the acoustic model generator means generates the new acoustic model from the caller-independent models of the generic acoustic model and modifies the caller-independent models of the speech units that are included in the voice input to represent the characteristics of the voice input received from the new caller such that the new acoustic model for the new caller and the acoustic models of any previously identified callers comprise the same plurality of speech units; and
means for generating a user prompt, which identifies certain ones of the acoustic models of previously identified callers for merging together.

13. The system of claim 12 and further wherein:
the system further comprises a speech recognizer, which segments the voice input into a sequence of recognized speech units using the generic acoustic model;
each of the plurality of acoustic models comprises models of the speech units recognized by the speech recognizer; and
the means for applying comprises means for applying the characteristics of the voice input to a sequence of the models of the speech units segmented by the speech recognizer for the plurality of acoustic models.

14. The system of claim 12 wherein:
the system further comprises an acoustic model updating module, which if the caller is identified as one of the previously identified callers, updates the respective acoustic model for the previously identified caller by modifying the models of the speech units that are included in the voice input, based on the characteristics of the voice input.

15. The system of claim 14 wherein the acoustic model updating module is capable of modifying the models of the speech units that are included in the voice input based on as little as a single utterance from the caller.

16. The system of claim 12 wherein the acoustic model generator means stores the new acoustic model in the acoustic model repository such that the new acoustic model becomes one of the plurality of acoustic models and the new caller is included as a previously identified caller.

17. The system of claim 12 wherein system is configured to receive the voice input and identify the caller without alerting the caller during the call that the caller is being identified.

18. The system of claim 12 wherein:
the means for applying comprises means for splitting the voice input into subsections and applying the characteristics of each subsection to the plurality of acoustic models to obtain a plurality of respective acoustic scores that represent how well the characteristics in each subsection match the respective acoustic models; and
the means for identifying comprises, for each subsection, means for identifying the acoustic model having the best acoustic score for that subsection and means for identifying the caller as one of the previously identified callers only if the best acoustic scores for all subsections correspond to the same previously identified caller.

19. The system of claim 12 and further comprising:
a language model repository for storing a caller-specific language model for each of the previously identified callers based on the voice inputs from those callers;
means for applying the characteristics of the voice input to the generic acoustic model and each of the caller-specific language models to produce a plurality of recognized speech unit sequences; and
means for choosing the recognized speech unit sequence that has a highest probability relative to probabilities of the other recognized speech unit sequences, wherein the means for identifying identifies the caller based at least in part on the recognized speech unit sequence having the highest probability.

20. The system of claim 19 wherein the means for identifying comprises means for generating a user prompt of at least one member of the group comprising: (1) the voice input, the recognized speech unit sequence having the highest probability, (2) the caller-specific language model producing the recognized speech unit sequence having the highest probability, and (3) the acoustic model having the best acoustic score, if the caller-specific language model having the highest probability corresponds to a different caller than the acoustic model having the best acoustic score in (3).

21. The system of claim 12 and further comprising:
means for flagging the certain acoustic models for merging together based on a distance measure between the plurality of acoustic models.

22. A computer-readable medium comprising computer-executable instructions that, when executed by a computer, performs the method comprising:
(a) receiving a voice input of a call from a caller;

(b) applying characteristics of the voice input to a plurality of acoustic models, which comprises a generic acoustic model and acoustic models of previously identified callers, to obtain a plurality of respective acoustic scores that represent how well the characteristics match the respective acoustic models, wherein the generic acoustic model comprises caller-independent models of a plurality of speech units; and (c) identifying the caller as one of the previously identified callers or a new caller based on the plurality of acoustic scores (d) if the caller is identified as a new caller in step (c), generating a new acoustic model for the new caller from the caller-independent models of the generic acoustic model and modifies the caller-independent models of the speech units that are included in the voice input to represent the characteristics of the voice input received from the new caller such that the new acoustic model for the new caller and the acoustic models of any previously identified callers comprise the same plurality of speech units; and (e) generating a user prompt, which identifies certain ones of the acoustic models of previously identified callers for merging together.

23. The computer-readable medium of claim 22 wherein:
step (a) comprises segmenting the voice input into a sequence of recognized speech units using the generic acoustic model;
each of the plurality of acoustic models comprises models of the speech units segmented in step (a); and
step (b) comprises applying the characteristics of the voice input to a sequence of the models of the speech units segmented in step (a) for the plurality of acoustic models.

24. The computer-readable medium of claim 22 wherein the method further comprises:
(f) if the caller is identified as one of the previously identified callers in step (c), updating the respective acoustic model for the previously identified caller by modifying the models of the speech units that are included in the voice input, based on the characteristics of the voice input.

25. The computer-readable medium of claim 22 wherein the method further comprises:
(f) storing the new acoustic model in an acoustic model repository with the plurality of acoustic models such that the new acoustic model becomes one of the plurality of acoustic models in step (b) and the new caller is included as a previously identified caller.

26. The computer-readable medium of claim 22 wherein the method further comprises:
(f) maintaining a caller-specific language model for each of the previously identified callers; and
(g) identifying the caller based at least in part on probabilities of recognized speech unit sequences produced by the caller-specific language models from the voice input.

27. The computer-readable medium of claim 26 wherein the method further comprises:
(h) if the caller identified in step (g) is different than the caller identified in step (c), generating a user prompt of at least one member of the group comprising: the voice input, the recognized speech unit sequence, the identified callers, the acoustic model of the caller identified in step (c), and of the caller-specific language model of the caller identified in step (g).

28. The computer-readable medium of claim 22 wherein the method further comprises:
(f) using a distance measure between the plurality of acoustic models of the previously identified callers to flag the certain acoustic models for merging together.

29. A computer-implemented method of identifying a caller of a call from the caller to a recipient, the method comprising:
(a) receiving a voice input;
(b) segmenting the voice input into a sequence of recognized speech units using a caller-independent, generic acoustic model, wherein the generic acoustic model comprises caller-independent models of a plurality of speech units;
(c) applying characteristics of the voice input to a sequence of speech unit models of the recognized speech units within a plurality of acoustic models, which comprises the generic acoustic model and acoustic models of any previously identified callers
(d) identifying the caller as one of a plurality of previously identified callers or as a new caller based on how well the characteristics of the voice input fit the plurality of acoustic models, and if the caller is identified as a new caller, generating a new acoustic model for the new caller from the generic acoustic model by modifying the speech unit models of the speech units that are included in the voice input to represent the characteristics of the voice input received from the new caller such that the new acoustic model for the new caller and the acoustic models of any previously identified callers comprise the same plurality of speech units;
(e) maintaining a caller-specific language model for each of the previously identified callers based on the voice inputs from those callers;
(f) applying the characteristics of the voice input to the generic acoustic model and each of the caller-specific language models to produce a plurality of recognized speech unit sequences;
(g) choosing the recognized speech unit sequence that has a highest probability relative to probabilities of the other recognized speech unit sequences;
(h) identifying the caller based on the recognized speech unit sequence having the highest probability; and
(i) if the caller identified in step (h) is different than the caller identified in step (d), generating a user prompt of at least one member of the group comprising: the voice input, the recognized speech unit sequence, the identified callers, the acoustic model of the caller identified in step (d), and of the caller-specific language model of the caller identified in step (h).

30. The method of claim 29 and further comprising:
(j) storing the new acoustic model in an acoustic model repository with the plurality of acoustic models such that the new acoustic model becomes one of the plurality of acoustic models in step (c) and the new caller is included as a previously identified caller.

31. The method of claim 29 wherein the method further comprises:
(j) using a distance measure between the plurality of acoustic models of the previously identified callers to flag certain acoustic models for merging together.

* * * * *